United States Patent
Sauls, Jr. et al.

(10) Patent No.: US 7,383,516 B2
(45) Date of Patent: Jun. 3, 2008

(54) SYSTEMS AND METHODS FOR DISPLAYING AND EDITING HIERARCHICAL DATA

(75) Inventors: Larry J Sauls, Jr., Woodinville, WA (US); Kent D. Cedola, Bellevue, WA (US); David E Guimbellot, Bellevue, WA (US); Quanzhan Zheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 11/105,254

(22) Filed: Apr. 13, 2005

(65) Prior Publication Data

US 2006/0235857 A1 Oct. 19, 2006

(51) Int. Cl.
*G06F 3/048* (2006.01)
(52) U.S. Cl. .................................. 715/854; 707/100
(58) Field of Classification Search ................ 707/100, 707/3, 101; 715/853, 854
See application file for complete search history.

(56) References Cited

U.S. PATENT DOCUMENTS

| | | | |
|---|---|---|---|
| 4,631,363 A | 12/1986 | Foster et al. | |
| 5,388,196 A * | 2/1995 | Pajak et al. | 715/751 |
| 5,838,319 A | 11/1998 | Guzak et al. | |
| 5,920,700 A | 7/1999 | Gordon et al. | |
| 5,953,724 A * | 9/1999 | Lowry | 707/102 |
| 5,978,576 A | 11/1999 | Sanadidi et al. | |
| 6,192,470 B1 | 2/2001 | Kelley et al. | |
| 6,496,842 B1 * | 12/2002 | Lyness | 715/514 |
| 7,096,178 B2 | 8/2006 | Gluhovsky | |
| 7,149,731 B2 | 12/2006 | Dettinger et al. | |
| 2002/0178075 A1 | 11/2002 | Emerick et al. | |
| 2003/0046396 A1 | 3/2003 | Richter et al. | |
| 2003/0163298 A1 | 8/2003 | Odom et al. | |
| 2003/0167381 A1 | 9/2003 | Herscovich et al. | |
| 2003/0176993 A1 | 9/2003 | Lines et al. | |
| 2004/0049372 A1 | 3/2004 | Keller | |
| 2004/0107219 A1 | 6/2004 | Rosenberger | |
| 2004/0181794 A1 | 9/2004 | Coleman et al. | |
| 2005/0027661 A1 | 2/2005 | Lober et al. | |
| 2005/0102121 A1 | 5/2005 | Odhner et al. | |
| 2005/0125401 A1 | 6/2005 | Carr et al. | |
| 2005/0195165 A1 | 9/2005 | Mitchell | |
| 2006/0047813 A1 | 3/2006 | Aggarwal et al. | |
| 2006/0112130 A1 | 5/2006 | Lowson | |
| 2006/0161417 A1 | 7/2006 | Hardwick et al. | |
| 2006/0167704 A1 | 7/2006 | Nicholls et al. | |

OTHER PUBLICATIONS

Marc, "Free Windows Explorer replacement with tabbed UI", Apr. 7, 2004, p. 2.

* cited by examiner

*Primary Examiner*—Stephen Hong
*Assistant Examiner*—Phenuel S Salomon
(74) *Attorney, Agent, or Firm*—Lee & Hayes, PLLC (57) ABSTRACT

Systems and methods for displaying hierarchical data are described. In an implementation, a method includes processing hierarchical data describing a distributed computing environment. The hierarchical data includes a plurality of levels, in which, at least one of the levels includes a plurality of containers, each of the containers includes one or more items, and each of the items is disposed in another level that is a child of the at least one level. The processed hierarchical data is output for display in a single window on a display device such that the hierarchical data indicates a relationship between each of the items and a respective one of the containers and is configured such that each of the items may be edited without interacting with another window.

16 Claims, 8 Drawing Sheets

SYSTEMS AND METHODS FOR DISPLAYING AND EDITING HIERARCHICAL DATA

TECHNICAL FIELD

The present invention generally relates to hierarchical data and more particularly relates to systems and methods for displaying and editing hierarchical data.

BACKGROUND

Users are exposed to increasing amounts of data in everyday life. For example, a user may have thousands of songs available on a portable digital music player, store hundreds of documents on a personal computer, and so on. A variety of techniques may be utilized to organize this data such that the user can locate a particular item of interest.

One such technique is hierarchical organization. Hierarchies include multiple "levels" of data organized in "parent/child" relationships. For example, a hierarchy may be specified to describe equipment owned by a company. Therefore, a first level of the hierarchy may be "corporation", a second level may be specified as "office", a third level may be specified as "equipment" in each office, a fourth level may be specified for "components" for each equipment item, and so on. Although this is an intuitive way of organizing the data which describes the equipment owned by the corporation, it may difficult to navigate through this organization to arrive at particular data of interest. For example, if a user changes different components utilized in different offices, the user is forced to navigate "through" the hierarchy to each equipment item, back "up" to the "office" level, and then back "down" through the levels to interact with another equipment item.

Therefore, there is a continuing need for improved techniques for displaying and editing hierarchical data.

SUMMARY

Systems and methods for displaying hierarchical data are described. In an implementation, a method is described which includes receiving hierarchical data. The hierarchical data includes a plurality of levels. At least one of the levels includes a plurality of containers, each of which includes one or more items, and each of the items is disposed in another one of the levels that is a child of the at least one level. Each of the items is displayed concurrently in a single window. The items, when displayed, indicate a relationship between each of the items and a respective one of the containers as well as a relationship between the plurality of items, one to another.

In another implementation, a method includes processing hierarchical data describing a distributed computing environment. The hierarchical data includes a plurality of levels, in which, at least one of the levels includes a plurality of containers, each of the containers includes one or more items, and each of the items is disposed in another level that is a child of the at least one level. The processed hierarchical data is output for display in a single window on a display device such that the hierarchical data indicates a relationship between each of the items and a respective one of the containers and is configured such that each of the items may be edited without interacting with another window.

BRIEF DESCRIPTION OF THE DRAWINGS

The same reference numbers are utilized in instances in the discussion to reference like structures and components.

DETAILED DESCRIPTION

Overview

Systems and methods for displaying and editing hierarchical data are described. Hierarchical data is a technique for ordering data such that a user can locate data of interest. However, the amount of information available to the user can be overwhelming and increases the difficulty to the user in self discovering particular data of interest. For example, a network topology of a distributed computing environment may be represented using hierarchical data. However, because the network may include hundreds of components, devices which use those components, offices which contain the devices, sites which contain the offices, and so on, the user may have a difficult time navigating between levels of the hierarchy and even to different items in the same level of the hierarchy.

In an implementation, systems and methods are described for display and editing of hierarchical data describing a distributed computing environment in a user interface. For example, the user interface may provide a single view of items that are specific to a level within the hierarchical data such that the user is not forced to navigate between levels to access different items at the same level. The user interface may also provide an indication of the current location within the hierarchical data, such as the particular level, at which, the items are located within the hierarchy. Further, the user interface may also display multiple items within a level for different "branches" and group the items based on type. For example, a "components" level of a hierarchy may include a group for network cards, another group of display devices, and so on. A variety of other configurations for the user interface are also contemplated, further discussion of which may be found in the following sections.

An exemplary environment is first described which is operable to employ the display and editing techniques for hierarchical data, along with exemplary user interfaces which utilize these techniques. Exemplary procedures are then described which may be performed in the exemplary environment, as well as in other environments without departing from the spirit and scope thereof.

Exemplary Environment

Figure 1:
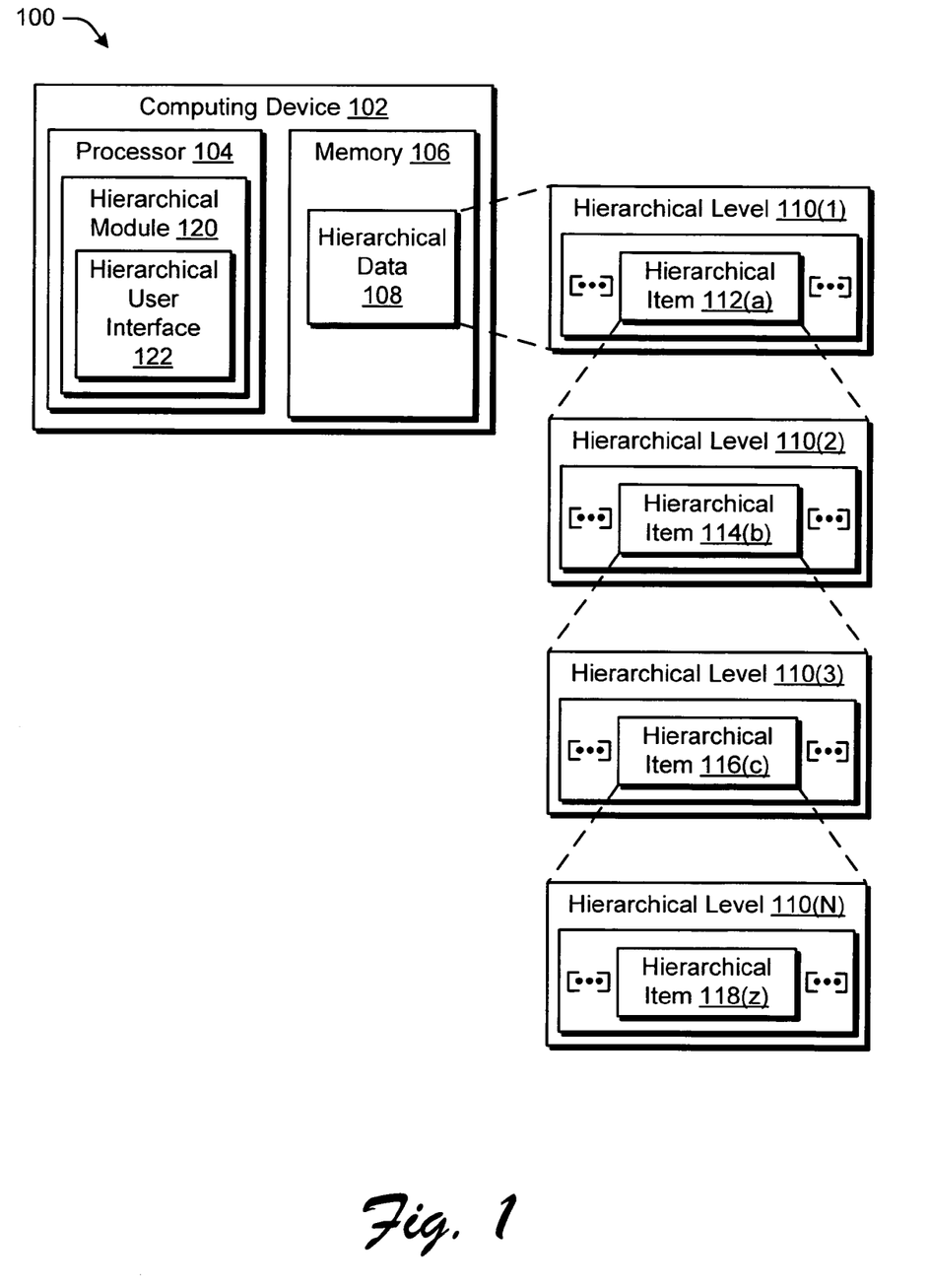
FIG. 1 is an illustration of an environment in an exemplary implementation that is operable to employ techniques for displaying and editing hierarchical data.

FIG. 1 is an illustration of an environment 100 in an exemplary implementation that is operable to employ techniques for displaying and editing hierarchical data. The illustrated environment 100 includes a computing device 102. The computing device 102 may be configured in a variety of ways. For example, the computing device may be configured as a desktop computer, a mobile station, an entertainment appliance, a set-top box communicatively coupled to a display device, a wireless phone, a game console, and so forth. Thus, the computing device may range from a full resource device with substantial memory and processor resources (e.g., personal computers, game consoles) to a low-resource device with limited memory and/or processing resources (e.g., traditional set-top boxes, hand-held game consoles).

The computing device is illustrated as including a processor 104 and memory 106. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 106 is shown, a wide variety of types and combinations of memory may be employed, such as random access memory (RAM), hard disk memory, removable medium memory, and so forth. Additional discussion of an exemplary computing device may be found in relation to FIG. 8.

The computing device 102 is also illustrated as including hierarchical data 108 stored in memory 106. A hierarchy is a series of ordered groups (e.g., hierarchical levels 110(1), 110(2), 110(3), . . . , 110(N)), the ordering of which is based on one or more considerations. For example, a hierarchy may be a "type" hierarchy, a "broad/narrow" hierarchy, and so on. A "type" type hierarchy is a partial ordering of concept types by a type-subtype relation, i.e., a "parent/child" relationship. A "broad/narrow" hierarchy orders items for classification based on relationships in which each item except the top one (i.e., the "root") is a specialized form of the item, from which, it depends. Thus, each of the hierarchical levels 110(1)-110(N) has a defined relationship between that level and at least one other level.

The hierarchical data 108, for instance, may include a first hierarchical level 110(1) which includes a plurality of hierarchical items 112(a), where "a" can be any integer from one to "A". This first hierarchical level 110(1), for instance, may be configured as a "root" level of a single hierarchy or for multiple hierarchies. The hierarchical item 112(a) may also be configured in a variety of ways. For example, a hierarchical item 112(a) may be configured as a value for inclusion at that level, such as a value for a type defined by the hierarchical level 110(1).

A hierarchical item 112(a) may also be configured as a "container" that contains a plurality of other hierarchical items 114(b), where "b" can be any integer from one to "B", which is disposed in another hierarchical level 110(2). For example, hierarchical item 112(a) may specify a value of "corporation" and hierarchical items 114(b) contained within the hierarchical item 112(a) may specify "offices" within the corporation. Likewise, a plurality of hierarchical items 116(c) (where "c" can be any integer from one to "C") may be included within each hierarchical item 114(b) of that hierarchical level 110(2). Thus, the plurality of hierarchical items 116(c) define another hierarchical level 110(3). This organization may be repeated for additional hierarchical levels, which are illustrated as hierarchical items 118(z) (where "z" can be any integer from one to "Z") which are included in hierarchical level 110(N). Although four hierarchical levels (e.g., hierarchical levels 110(1)-110(N)) are illustrated, the hierarchy may include two or more hierarchical levels without departing from the spirit and scope thereof.

The computing device 102 is illustrated as executing a hierarchical module 120 on the processor 104, which is also storable in memory 106. The hierarchical module 120 is executable to employ techniques for display and/or editing of the hierarchical data 108. For example, the hierarchical module 120 may process the hierarchical data 108 for display in a hierarchical user interface 122 such that a user of the computing device 102 may view a display of the hierarchical data 120.

The hierarchical module 120 may be implemented in a variety of ways to display the hierarchical data 108. For example, the hierarchical module 120 may be employed as a part of an operating system. Therefore, an application which provides an output of hierarchical data may have this data processed for display in the hierarchical user interface 122 without being "aware" of how this data processing was performed. In another example, the hierarchical module 120 may be a part of the application itself to display the hierarchical data 108. In a further example, the hierarchical module 120 may be a "stand-alone" module which is configured to provide a display of hierarchical data which may be edited by a user of the computer device 102. The hierarchical user interface 120 may be configured to output hierarchical data for display in a variety of ways, examples of which may be found in relation to FIGS. 2-5.

Generally, any of the functions described herein can be implemented using software, firmware (e.g., fixed logic circuitry), manual processing, or a combination of these implementations. The terms "module," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 106 of the computing device 102. The features of the display and editing techniques described below are platform-independent, meaning that the techniques may be implemented on a variety of commercial computing platforms having a variety of processors.

Figure 2:
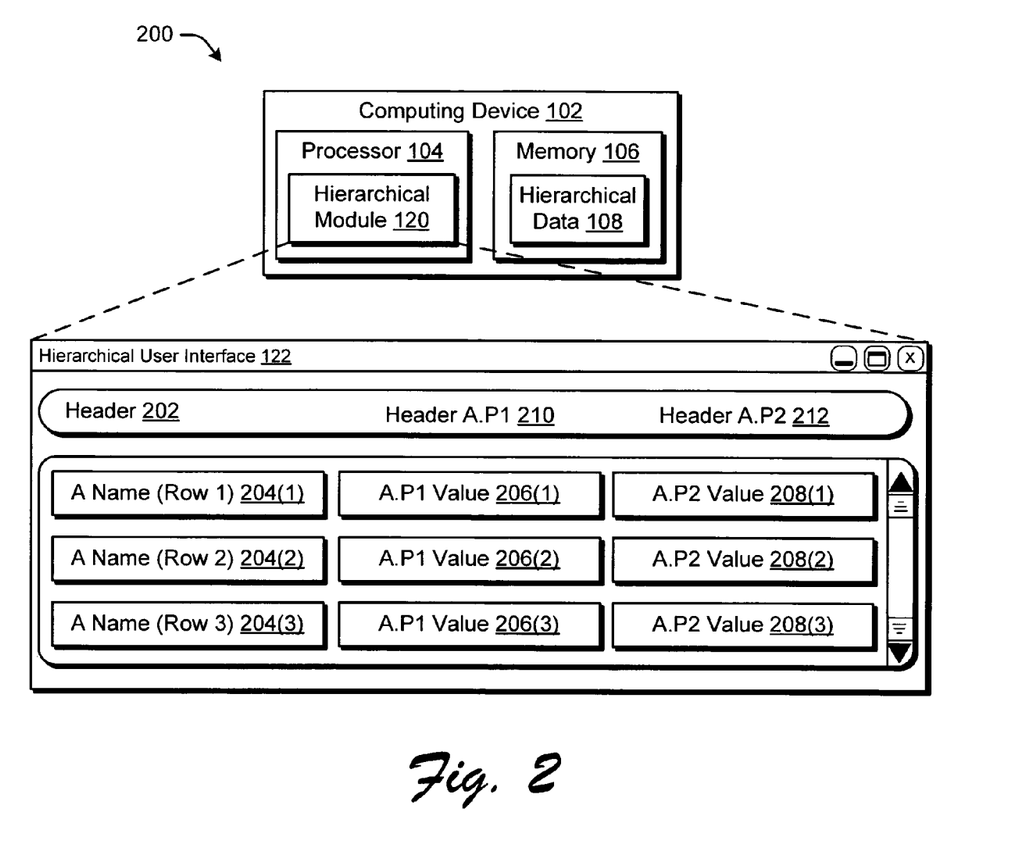
FIG. 2 is an illustration of an exemplary implementation showing a computing device of FIG. 1 as outputting a hierarchical user interface to display a level of hierarchical data.

FIG. 2 is an illustration of an exemplary implementation 200 showing the computing device of FIG. 1 as outputting the hierarchical user interface 122 to display a level of the hierarchical data 120. The hierarchical user interface 122 is displayed in a window having a header 202 and a plurality of items 204(1)-204(3), 206(1)-206(3), 208(1)-208(3) taken from hierarchical level 110(1) of the hierarchical data 108. For example, items 204(1)-204(3) represent names for the respective row and items 204(1)-204(3), 206(1)-204(3) represent values which correspond to that row.

The header 202 is displayed in conjunction with the items and provides names of the values in the rows. For example, header "A.P1" 210 corresponds to items 206(1)-206(3) and header "A.P2" corresponds to items 208(1)-208(3). For instance, header "A.P1" 210 may specify a relationship for the items 206(1)-206(3) in the respective column defined by the arrangement of the items 206(1)-206(3), such as a particular type of values.

In an implementation, the header 202 "floats" in conjunction with the plurality of items 204(1)-204(3), 206(1)-206(3), 208(1)-208(3) such that a user may scroll through a listing of items (e.g., through use of the illustrated scroll bar) yet still have the header 202 displayed in conjunction with the respective items. The header 202 is displayed as separated from the plurality of items 204(1)-204(3), 206(1)-206(3), 208(1)-208(3) by a "gap" such that a user, when viewing the hierarchical user interface 202, may readily determine a distinction between the plurality of items 204(1)-204(3), 206(1)-206(3), 208(1)-208(3) and the header 202.

Figure 3:
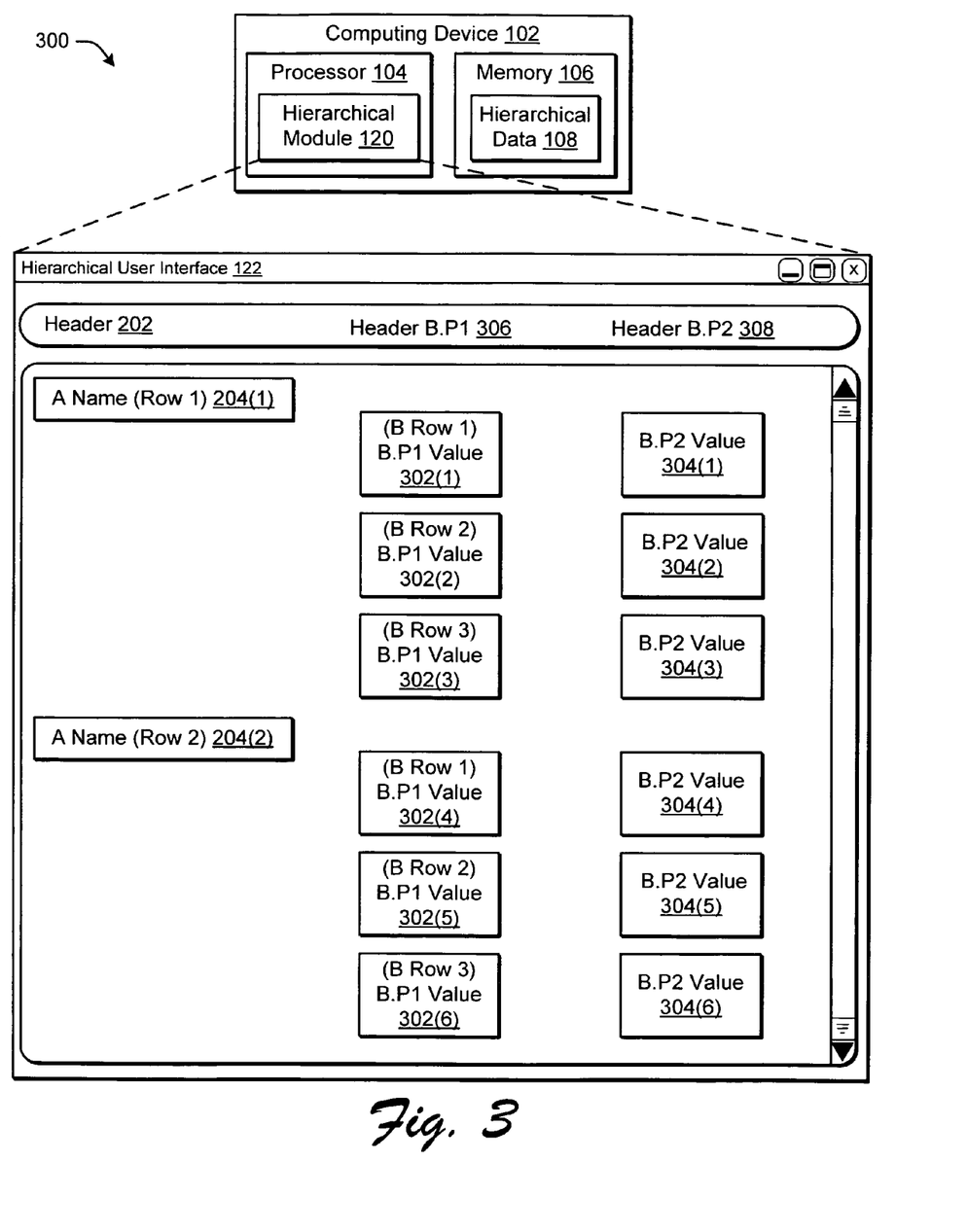
FIG. 3 is an illustration of an exemplary implementation showing the computing device of FIG. 1 as outputting the hierarchical user interface of FIG. 2 to display a level of the hierarchical data which is a "child" of the hierarchical level illustrated in FIG. 2.

FIG. 3 is an illustration of an exemplary implementation 300 showing the computing device of FIG. 1 as outputting the hierarchical user interface 122 to display a level of the hierarchical data 108 which is a "child" of the hierarchical level illustrated in FIG. 2. This exemplary implementation 300 illustrates level 110(2) of the hierarchical data 108 which is a "child" of level 110(1).

The hierarchical user interface 202 in this exemplary implementation 300 includes items (e.g., items 204(1), 204(2)) from the hierarchical level 110(1). A plurality of items 302(1)-302(6), 304(1)-304(6) are "nested" in relation to the items 204(1), 204(2) from the previous hierarchical level 110(1). Thus, a relationship between the items 302(1)-302(6), 304(1)-304(6) of level 110(2) and items 204(1)-204(2) may be indicated such that a user, when viewing the items, is made aware of which hierarchical level of the hierarchical data 108 includes the items which are currently displayed.

The plurality of items 302(1)-302(6), 304(1)-304(6) of level 110(2) are illustrated as two separate tables. For instance, items 302(1)-302(3), 304(1)-304(3) form a first table and items 302(4)-302(6), 304(4)-304(6) form a second table. Item 204(1) indicates a particular item from a preceding level (i.e., a level "higher" in the hierarchy) of the hierarchical data 108, from which, the plurality of items 302(1)-302(3), 304(1)-304(3) depend. Thus, a user of the computing device 102 may readily determine the "placement" of the items 302(1)-302(3), 304(1)-304(3) within the hierarchy.

Likewise, items 302(4)-302(6), 304(4)-304(6) form a second table. The item 204(2) also indicates a particular item from a preceding level (i.e., level 110(1)) of the hierarchical data 108, from which, the plurality of items 302(4)-302(6), 304(4)-304(6) depend. Thus, the "placement" of the items 302(4)-302(6), 304(4)-304(6) within the hierarchy is also readily apparent to a user of the computing device 102.

Additionally, both the first and second tables may be thought of as forming a larger table which also describes relationships of each of the items 302(1)-302(6), 304(1)-304(6) at that level 110(2) of the hierarchy. For example, a user of the computing device 102, when viewing the hierarchical user interface 202 of the embodiment 300 of FIG. 3 is informed as to which items 302(1)-302(6), 304(1)-304(6) are included in a level of the hierarchical data 108. The user is also informed as to which level of the hierarchy contains the items 302(1)-302(6), 304(1)-304(6) by nesting tables including the items in relation to items taken from "parent" levels of the hierarchy. Further, the user is informed as to the relationships of items at that level through positioning the items in accordance with the header 202, which may depict identifying characteristics 306, 308 of the respective items 302(1)-302(6), 304(1)-304(6). For example, the identifying characteristic 306 of items 302(1)-302(6) may be a common "type", (e.g., "picture") whereas the identifying characteristic 308 of items 302(1)-302(6) may be another "type" which is common to items 304(1)-304(6), e.g., "song". A variety of other examples are also contemplated without departing from the spirit and scope thereof.

Figure 4:
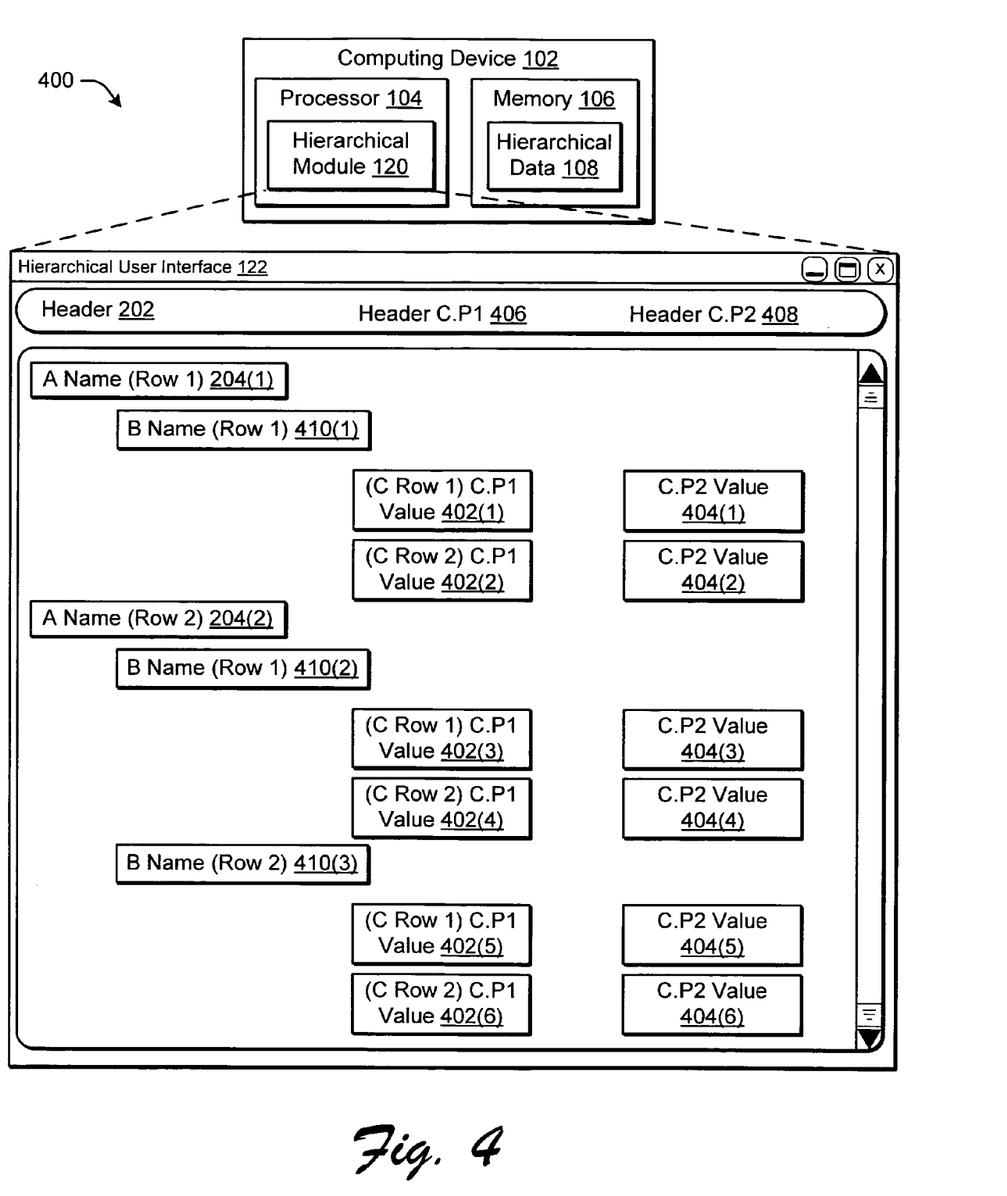
FIG. 4 is an illustration of an exemplary implementation showing the computing device of FIG. 1 as outputting the hierarchical user interface of FIG. 2 to display a level of the hierarchical data which is a "child" of the hierarchical level illustrated in FIG. 3.

FIG. 4 is an illustration of an exemplary implementation 400 showing the computing device 102 of FIG. 1 as outputting the hierarchical user interface 202 of FIG. 2 to display a level 110(3) of the hierarchical data which is a "child" of the hierarchical level 110(2) illustrated in FIG. 3. The illustrated hierarchical level displayed in the hierarchical user interface 122 also includes a plurality of items 402(1)-402(6), 404(1)-404(6). As before, the plurality of items 402(1)-402(6), 404(1)-404(6) are arranged under their respective headers 406, 408 to define a table of values for that hierarchical level.

The plurality of items 402(1)-402(6), 404(1)-404(6) in the hierarchical level are nested in relationship to items 410(1), 410(2), 410(3) which represent the previous hierarchical level displayed in FIG. 3. Further, these items 402(1)-402(6), 404(1)-404(6) are displayed to indicate a relationship between particular items 402(1)-402(6), 404(1)-404(6) in the displayed hierarchical level and particular items from the "parent" hierarchical level. For example, items 402(1)-402(2), 404(1)-404(2) are nested in relation to item 410(1) which indicates a name of a row from the parent hierarchical level. Likewise, items 402(3)-402(4), 404(3)-404(4) are nested in relation to item 410(2) and items 402(5)-402(6), 404(5)-404(6) are nested in relation to item 410(3). Further, items 410(1)-410(3) are nested in relation to items 204(1)-204(2) from their parent hierarchical level.

Thus, a user, when viewing the hierarchical user interface 122, may readily determine that item 204(1) is a parent of item 410(1), which includes items 402(1), 402(2), 404(1), 404(2) as "children". Likewise, the user is informed as to the relationship of those items 402(1), 402(2), 404(1), 404(2) to other items in the hierarchy. For example, the user may determine that items 402(3)-402(6), 404(3)-404(6) share a common item 204(2) at two hierarchical levels "above" the items, but have different respective parent items, i.e., items 410(2), 410(3).

Thus, the hierarchical user interface 122 provides a simplified technique for visualizing large collections of hierarchical data, which provides a better user experience and reduction in support costs. For example, the hierarchical user interface 122 provides single window which contains items which are specific to a level within the hierarchical data, provides a clear indication of a current location within the hierarchical data, displays rows of multiple tables concurrently, and so on.

Figure 5:
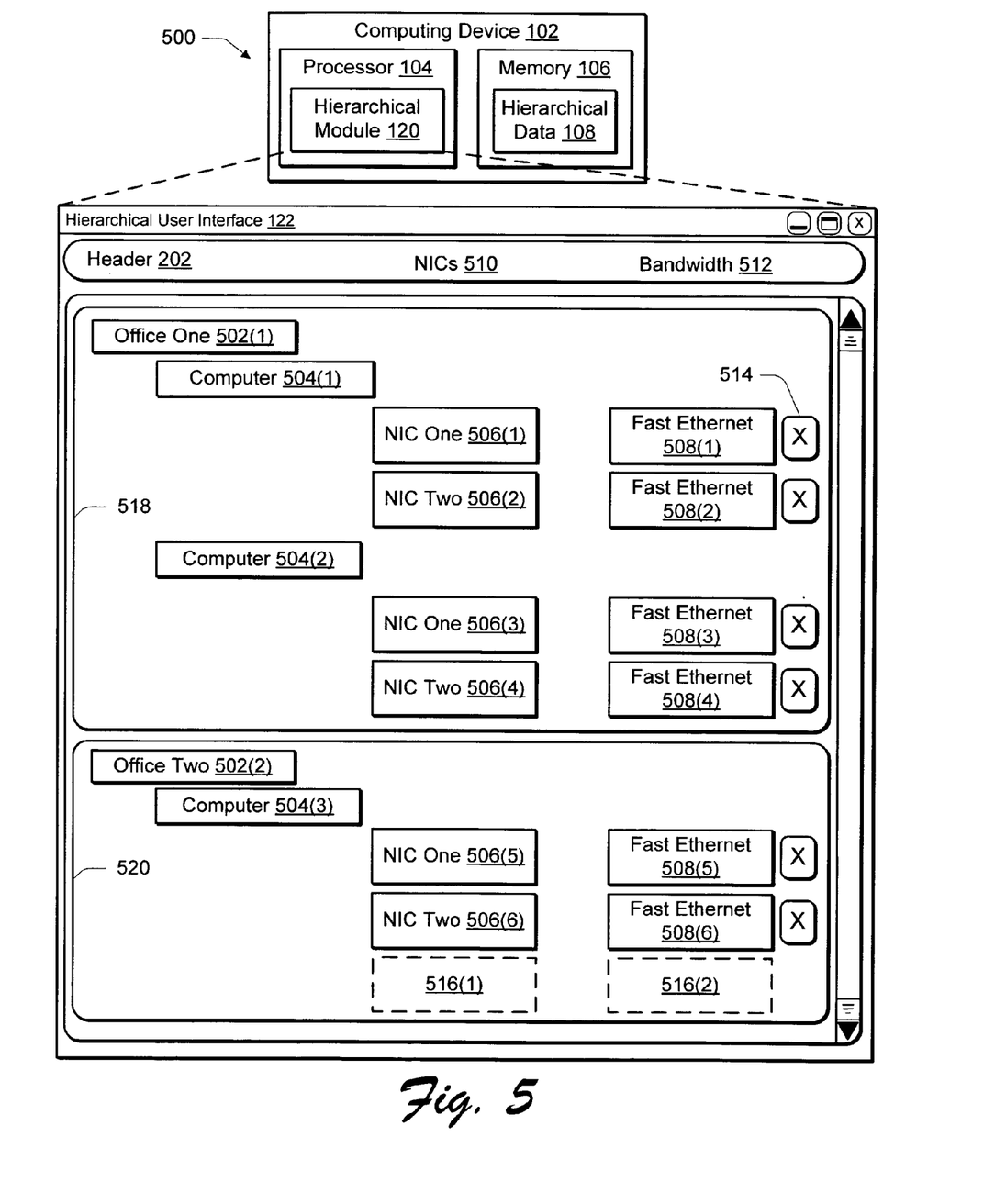
FIG. 5 is an illustration of another exemplary implementation showing the computing device of FIG. 1 as outputting the hierarchical user interface of FIG. 2 to display a level of hierarchical data for a network topology of a distributed computing environment.

FIG. 5 is an illustration of another exemplary implementation 500 showing the computing device 102 of FIG. 1 as outputting the hierarchical user interface 122 of FIG. 2 to display a level of hierarchical data for a network topology of a distributed computing environment. The displayed network topology includes a plurality of offices 502(1), 502(2) having a plurality of computers 504(1)-504(3), each of which having a plurality of respective components 506(1)-506(6), 508(1)-508(6). As shown in FIG. 5, the plurality of items 506(1)-506(6), 508(1)-508(6) which form a first table are nested within the plurality of items 504(1)-504(1) of a "parent" tier to form a second table, which is nested within the plurality of items 502(1)-502(2) of another "parent" tier to form a third table. Thus, each item (e.g., 502(1)-502(2), 504(1)-504(3), 506(1)-506(6), 508(1)-508(6)) has a defined relationship with a plurality of other levels which is displayed concurrently. As before, the items 506(1)-506(6), 508(1)-508(6) include respective header information 510, 512 which describes a common characteristic of the respective items.

In an implementation, even though multiple levels of the hierarchy are displayed concurrently, the hierarchical user interface 122 is configured to limit editing of items to a particular level. For example, the hierarchical user interface 122 may be configured to permit a user to edit items 506(1)-506(6), 508(1)-508(6) at the "component" level of the hierarchical data 108 and prevent a user from editing the items at the "device level" (e.g., items 504(1)-504(3)) or the "location" level (e.g., items 502(1)-502(2)). Additionally, by grouping the items according to item dependency, items at the same level of the hierarchy may have the same name. For example, item 506(1) may have the same name (e.g., "NIC One") as items 506(3), 506(5).

It should be noted that the hierarchical user interface 122 may be configured to permit editing of items located in different "branches" of the hierarchical data 108 without navigating through another window. For example, a user may select item 506(2) and provide a name "NIC Two" and then select item 506(5) and provide a name "NIC One". Thus, the user was not forced to "click through each level of the hierarchy as previously required. For example, the user did not need to navigate through the "device" level (e.g., item 504(1)) to the "office" level (e.g., item 502(1)) and back down through the hierarchy (e.g., item 502(2) to item 504(3)) to locate a particular item (e.g., item 506(5)) that is located as the same level as the original item that was being modified (e.g., item 506(2)).

The hierarchical user interface 122 may also be configured to provide a wide variety of other functionality. For example, each row of items (e.g., items 506(1)-508(1)) that are configured for being edited (i.e., at the current hierarchical level for "editing") in the hierarchical user interface 122 may include a respective button 514 that, when selected, causes the respective row of items to be deleted.

In another example, functionality may be provided for adding additional items without forcing the user to navigate "outside" of the window displaying the items. For instance, the dashed boxes 516(1), 516(2) represent a space in the hierarchical user interface 122, at which, the user may enter data and have that data added to the hierarchical data 108 at the respective level. Thus, the user may enter data at the hierarchical level being displayed in the user interface 122 without having to select a drop-down menu and so on.

In a further example, the hierarchical user interface 122 may display items as grouped according to the "top" (i.e., parent) level currently being displayed. For example, a box 518 is shown in FIG. 5 which groups the items that are children of item 502(1) and another box 520 is shown which groups the items which are children of item 502(2). A variety of other display techniques may be utilized to provide this "top most" grouping, such as through common color, fonts, and so on.

Exemplary Procedures

The following discussion describes display and editing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the user interfaces shown in FIGS. 2-5.

Figure 6:
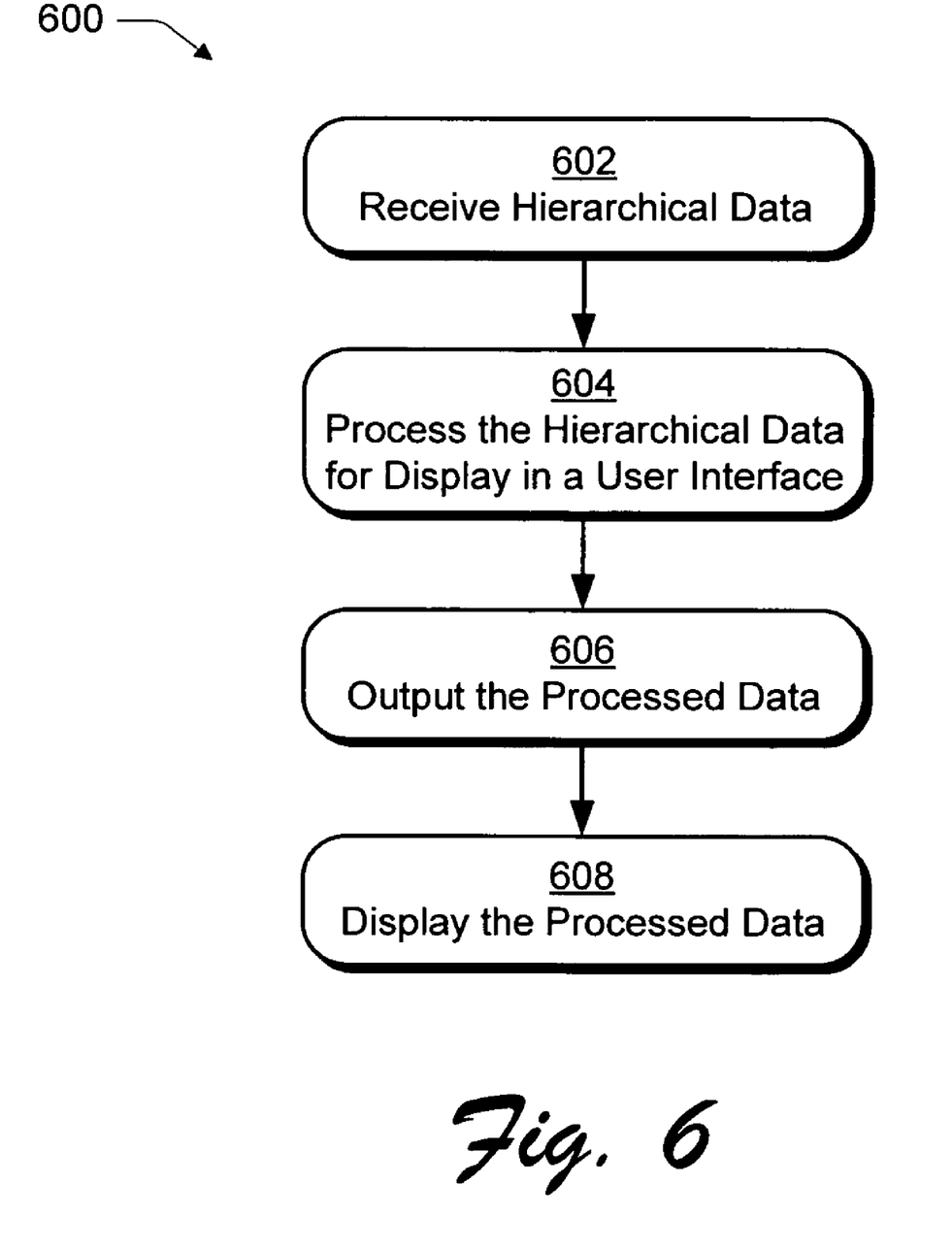
FIG. 6 is a flow diagram depicting a procedure in an exemplary implementation in which hierarchical data is processed for display in a hierarchical user interface.

FIG. 6 is a flow diagram depicting a procedure 600 in an exemplary implementation in which hierarchical data is processed for display in a hierarchical user interface. Hierarchical data is received (block 602) by a hierarchical module 120. This receiving may be performed in a variety of ways. For example, the hierarchical data may be passed from an application to the hierarchical module via an application programming interface, such as when the hierarchical module is incorporated into an operating system, as a stand-alone module, within another program, and so on. In another example, a user manually specifies each item in the hierarchical data and relationships between the items through interaction with a user interface.

The hierarchical data is processed for display in a user interface (block 604) by the hierarchical module 120. For example, the hierarchical module 120, when executed, may determine relationship between the items in the hierarchical data and derive one or more nested tables for display of the items as previously described in relation to FIGS. 2-5. The processed data is then output (block 606) and displayed (block 608).

Figure 7:
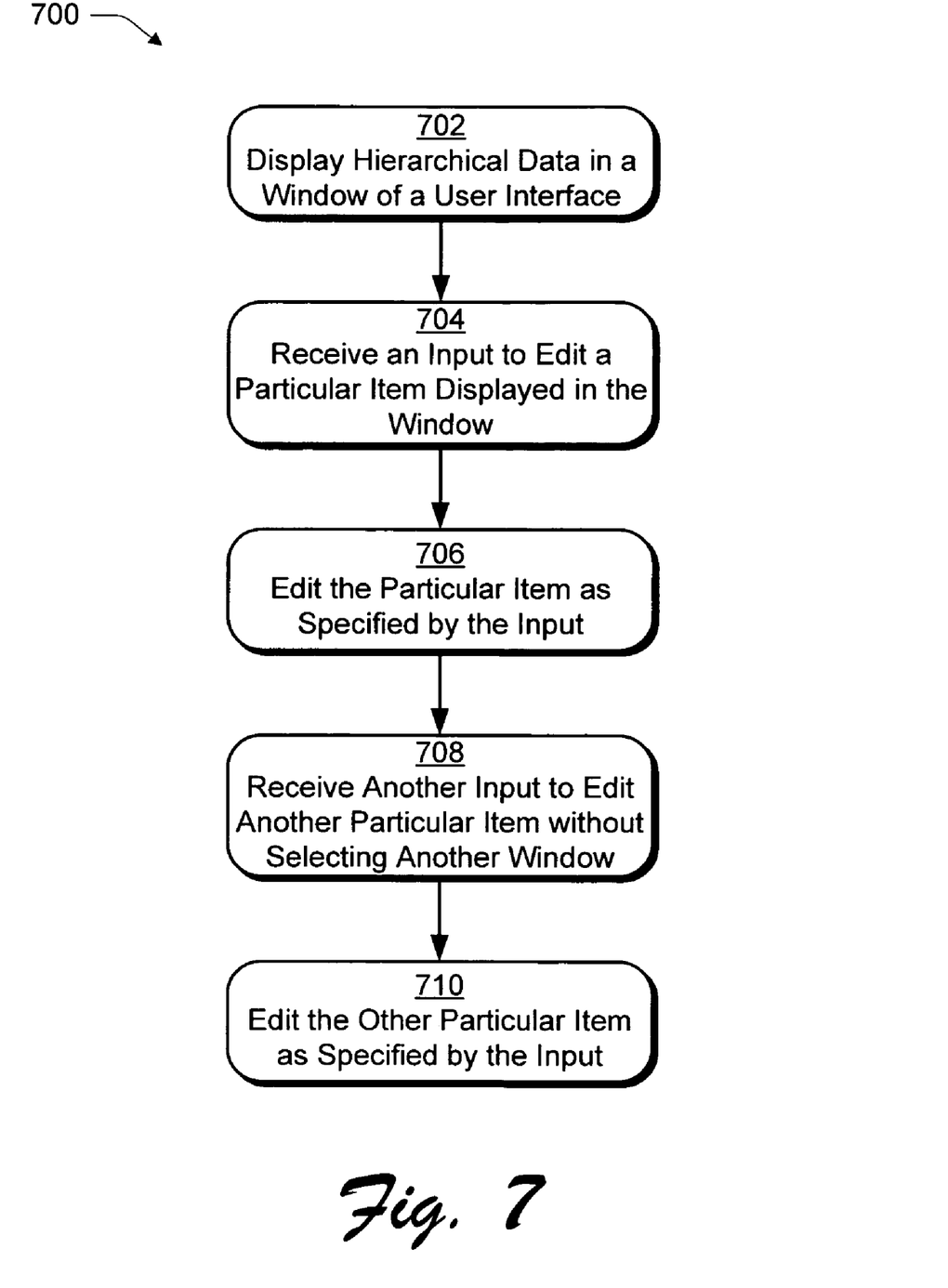
FIG. 7 is a flow diagram depicting a procedure in an exemplary implementation in which hierarchical data that is processed and displayed via the procedure of FIG. 6 is edited.

FIG. 7 is a flow diagram depicting a procedure 700 in an exemplary implementation in which hierarchical data processed and displayed via the procedure 600 of FIG. 6 is edited. Hierarchical data is displayed in a window of a user interface (block 702). For example, the hierarchical module 120 may output the hierarchical user interface 122 illustrated in FIG. 5.

An input is received to edit a particular item displayed in the window (block 704). For example, a user may manipulate a cursor control device (e.g., a mouse) to select a particular item for editing and enter text via a keyboard to edit the item. The user, for instance, may select item 506(1) and enter a name for the item. The hierarchical module 120 then edits the particular item as specified by the input (block 706).

Another input is received to edit another particular item without selecting another window (block 708). For example, the user may manipulate the cursor control device again and this time select item 506(5) for editing and enter a name for that item via a keyboard. The hierarchical module 120 then edits the particular item as specified by the input (block 710). It should be noted that in this example, the user selected different items at the same hierarchical level of the hierarchical data that are "positioned" on different respective branches of the hierarchy. For example, item 506(1) is a child of item 504(1) (i.e., "computer"), which is a child of item 502(1) (i.e., "office one") while item 506(5) is a child of item 504(4) (i.e., computer") which is a child of item 502(2) (i.e., "office two"). It should also be noted that similar techniques may be employed to edit items located on the same "branch" of the hierarchy without departing from the spirit and scope thereof.

Exemplary Operating Environment

Figure 8:
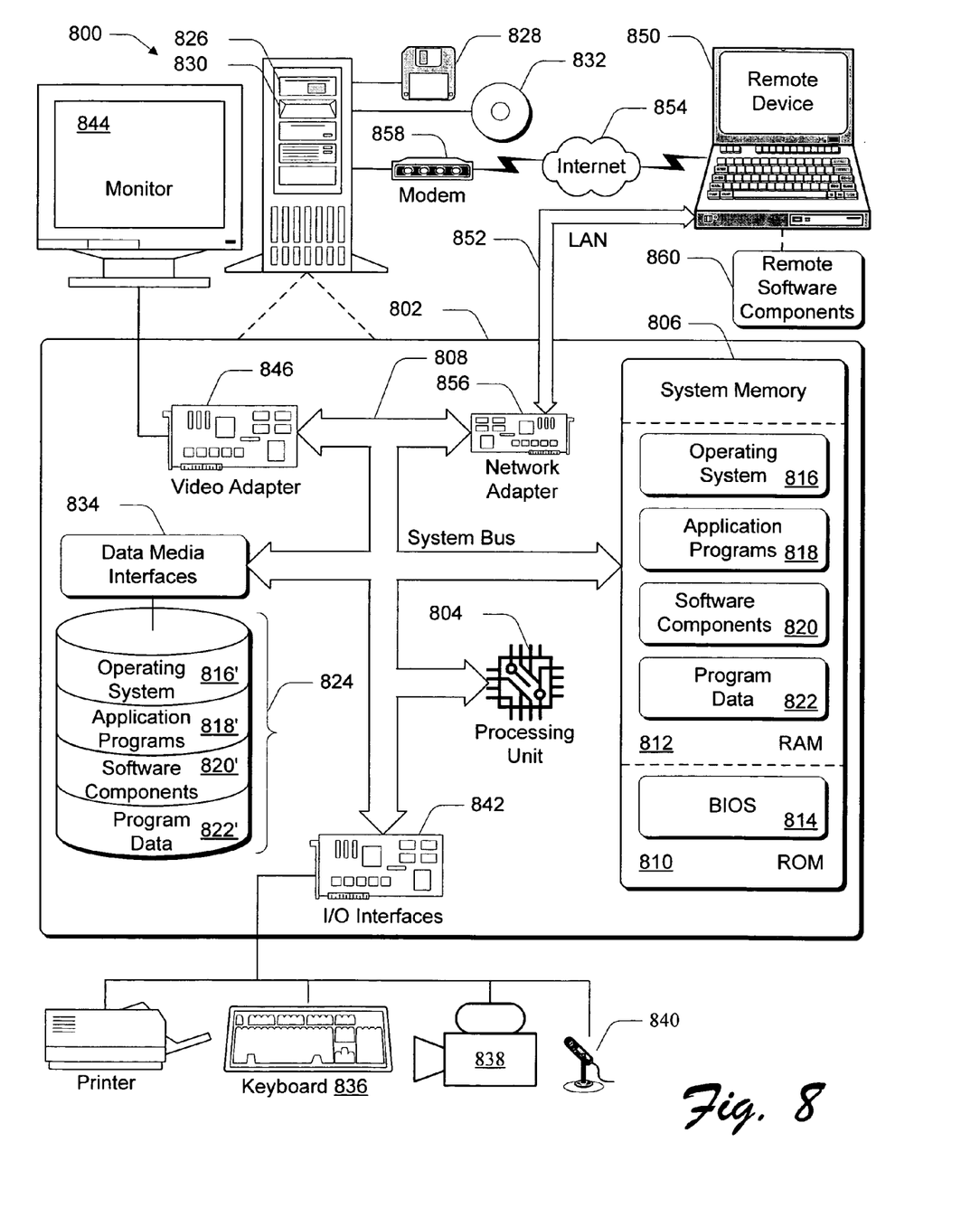
FIG. 8 is an illustration of an exemplary implementation of the computing device of FIG. 1.

The various components and functionality described herein are implemented with a number of individual computers. FIG. 8 shows components of a typical example of a computer environment 800, including a computer, referred by to reference numeral 802. The computer 802 may be the same as or different from computing device 102 of FIG. 1. The components shown in FIG. 8 are only examples, and are not intended to suggest any limitation as to the scope of the functionality of the invention; the invention is not necessarily dependent on the features shown in FIG. 8.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, network-ready devices, minicomputers, mainframe computers, distributed computing environments that include any of the above systems or devices, and the like.

The functionality of the computers is embodied in many cases by computer-executable instructions, such as software components, that are executed by the computers. Generally, software components include routines, programs, objects, components, data structures, etc. that perform particular tasks or implement particular abstract data types. Tasks might also be performed by remote processing devices that are linked through a communications network. In a distributed computing environment, software components may be located in both local and remote computer storage media.

The instructions and/or software components are stored at different times in the various computer-readable media that are either part of the computer or that can be read by the computer. Programs are typically distributed, for example, on floppy disks, CD-ROMs or DVD From there, they are installed or loaded into the secondary memory of a computer. At execution, they are loaded at least partially into the computer's primary electronic memory.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 8, the components of computer 802 may include, but are not limited to, a processing unit 804, a system memory 806, and a system bus 808 that couples various system components including the system memory to the processing unit 804. The system bus 808 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Computer 802 typically includes a variety of computer-readable media. Computer-readable media can be any available media that can be accessed by computer 802 and includes both volatile and nonvolatile media, removable and non-removable media. By way of example, and not limitation, computer-readable media may comprise computer storage media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 802.

The system memory 806 includes computer storage media in the form of volatile and/or nonvolatile memory such as read only memory (ROM) 810 and random access memory (RAM) 812. A basic input/output system 814 (BIOS), containing the basic routines that help to transfer information between elements within computer 802, such as during start-up, is typically stored in ROM 810. RAM 812 typically contains data and/or software components that are immediately accessible to and/or presently being operated on by processing unit 804. By way of example, and not limitation, FIG. 8 illustrates operating system 816, application programs 818, software components 820, and program data 822.

The computer 802 may also include other removable/non-removable, volatile/nonvolatile computer storage media. By way of example only, FIG. 8 illustrates a hard disk drive 824 that reads from or writes to non-removable, nonvolatile magnetic media, a magnetic disk drive 826 that reads from or writes to a removable, nonvolatile magnetic disk 828, and an optical disk drive 830 that reads from or writes to a removable, nonvolatile optical disk 832 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 824 is typically connected to the system bus 808 through a non-removable memory interface such as data media interface 834, and magnetic disk drive 826 and optical disk drive 830 are typically connected to the system bus 808 by a removable memory interface.

The drives and their associated computer storage media discussed above and illustrated in FIG. 8 provide storage of computer-readable instructions, data structures, software components, and other data for computer 802. In FIG. 8, for example, hard disk drive 824 is illustrated as storing operating system 816', application programs 818', software components 820', and program data 822'. Note that these components can either be the same as or different from operating system 816, application programs 818, software components 820, and program data 822. Operating system 816', application programs 818', software components 820', and program data 822' are given different numbers here to illustrate that, at a minimum, they are different copies. A user may enter commands and information into the computer 802 through input devices such as a keyboard 836, and pointing device (not shown), commonly referred to as a mouse, trackball, or touch pad. Other input devices may include source peripheral devices (such as a microphone 838 or camera 840 which provide streaming data), joystick, game pad, satellite dish, scanner, or the like. These and other input devices are often connected to the processing unit 802 through an input/output (I/O) interface 842 that is coupled to the system bus, but may be connected by other interface and bus structures, such as a parallel port, game port, or a universal serial bus (USB). A monitor 844 or other type of display device is also connected to the system bus 808 via an interface, such as a video adapter 846. In addition to the monitor 844, computers may also include other peripheral rendering devices (e.g., speakers) and one or more printers, which may be connected through the I/O interface 842.

The computer may operate in a networked environment using logical connections to one or more remote computers, such as a remote device 850. The remote device 850 may be a personal computer, a network-ready device, a server, a router, a network PC, a peer device or other common network node, and typically includes many or all of the elements described above relative to computer 802. The logical connections depicted in FIG. 8 include a local area network (LAN) 852 and a wide area network (WAN) 854. Although the WAN 854 shown in FIG. 8 is the Internet, the WAN 854 may also include other networks. Such networking environments are commonplace in offices, enterprise-wide computer networks, intranets, and the like.

When used in a LAN networking environment, the computer 802 is connected to the LAN 852 through a network interface or adapter 856. When used in a WAN networking environment, the computer 802 typically includes a modem 858 or other means for establishing communications over the Internet 854. The modem 858, which may be internal or external, may be connected to the system bus 808 via the I/O interface 842, or other appropriate mechanism. In a networked environment, program modules depicted relative to the computer 802, or portions thereof, may be stored in the remote device 850. By way of example, and not limitation, FIG. 8 illustrates remote software components 860 as residing on remote device 850. It will be appreciated that the network connections shown are exemplary and other means of establishing a communications link between the computers may be used.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
receiving hierarchical data including a plurality of levels, wherein:
at least one said level includes a plurality of containers;
each said container includes one or more items; and
each said item is disposed in another said level, each said item being a child of the at least one said level, wherein each of the one or more items comprise one or more row of one or more type of item; and
displaying each said item concurrently in a single window, wherein the displaying indicates:
a relationship between each said item, each respective said container, each of the at least one said level and the plurality of levels, wherein the relationship between each said item and the respective said container is indicated by displaying each respective said container along a first axis; and
a relationship between the plurality of said items, one to another, wherein the relationship between the one to another of the said items is indicated by displaying each row of each of the one or more type of item of each said container at a matching said level along a second axis in the single window, wherein the second axis is generally perpendicular to the first axis;
that each of the type of item is aligned under an associated descriptive header;
that each said item may be edited without interacting with another window;
that editing is limited to one or more of the plurality of levels; and
that a row of one or more type of item can be selectively deleted by selection of a feature aligned with each row.

2. A method as described in claim 1, wherein at least one said container is a folder.

3. A method as described in claim 1, wherein the relationship between each said item and the respective said container further indicates which of the plurality of levels, at which, each said item is located.

4. A method as described in claim 1, wherein:
at least one said item is a container which includes another item; and
the other item is disposed in yet another said level that is a child of the other said level.

5. A method as described in claim 1, wherein the relationship between each said item and the respective said container is indicated by displaying the item in conjunction with a name of the respective said container.

6. A method as described in claim 1, further comprising displaying a area in the single window for inserting another item for inclusion with the hierarchical data, wherein the area is configured to accept the other item without navigating from the single window.

7. A method comprising:
processing and displaying hierarchical data which describes a distributed computing environment, wherein:
the hierarchical data includes a plurality of levels, wherein the plurality of levels comprise a location level, a device level and a component level, wherein the component level is a child of the device level, and the device level is a child of the location level;
the location level includes one or more location container;
each location container includes one or more device container;
the device level includes each device container;
each device container includes a plurality of component names, wherein the plurality of component names reside in the component level, wherein the plurality of component names comprise one or more row of one or more type of component names; and
the processed hierarchical data is output for display in a single window on a display device, wherein the processed hierarchical data indicates a relationship between each location container, each device container and each component name, and when displayed:
shows each device container in the device level displayed on a first axis;
shows, for each device container in the device level, each row of each of the component name types contained in the device container, wherein each row is displayed on an axis that is generally perpendicular to the first axis;
shows each of the types of component names aligned under an associated descriptive header;
is operable to limit editing to one or more of the plurality of levels;
is configured such that each component name may be edited without interacting with another window; and
is configured such that a row of one or more type of component names can be selectively deleted by selection of a feature aligned with each row.

8. A method as described in claim 7, wherein the relationship between each component name and a respective device container further indicates which of the plurality of levels, at which, each component name is located.

9. A method as described in claim 7, wherein the relationship between each component name and a respective device container is indicated by displaying the component name in conjunction with a name of the respective device container.

10. A method as described in claim 7, wherein the relationship between each component name and at least one other component name is indicated by displaying a first type of component name from each device container at a matching level along a single axis in the single window.

11. A method as described in claim 10, wherein the relationship between each component name and a respective device container is indicated by displaying a first of the one or more row of component name in each device container along another axis in the single window.

12. One or more computer-readable media comprising computer executable instructions that, when executed, configure a computer to process hierarchical data describing a distributed computing environment for display, wherein:
  the hierarchical data has a plurality of levels, wherein the plurality of levels comprise a location level, a device level and a component level, wherein the component level is a child of the device level, and the device level is a child of the location level;
  location level includes one or more location container;
  each location container includes one or more device container;
  the device level includes each device container;
  each device container includes a plurality of component names, wherein the plurality of component names reside in the component level, wherein the plurality of component names comprise one or more row of one or more type of component names; and
  the processed hierarchical data is output for display in a single window on a display device, wherein the processed hierarchical data indicates a relationship between each location container, each device container and each component name, and when displayed:
    shows each device container in the device level displayed on a first axis;
    shows, for each device container in the device level, each row of each of the component name types contained in the device container, wherein each row is displayed on an axis that is generally perpendicular to the first axis;
    shows each of the types of component names aligned under an associated descriptive header;
    is operable to limit editing to one or more of the plurality of levels;
    is configured such that each component name may be edited without interacting with another window; and
    is configured such that a row of one or more type of component names can be selectively deleted by selection of a feature aligned with each row.

13. One or more computer readable media as described in claim 12, wherein the processed hierarchical data further indicates a relationship between each component name and a respective device container to indicate which of the plurality of levels, at which, each component name is located.

14. The one or more computer-readable media as described in claim 12, wherein a floating header in the single window is displayed concurrently with the plurality of hierarchical levels, wherein the floating header indicates a name of each level.

15. The one or more computer-readable media as described in claim 12, wherein an area in the single window is displayed for inserting another component name for inclusion with the hierarchical data, wherein the area is configured to accept the other component name without navigating from the single window.

16. A method as described in claim 1, wherein the displaying farther indicates a floating header in the single window concurrently with the plurality of hierarchical levels, wherein the floating header indicates a name of each said level.

* * * * *